United States Patent
Johnson et al.

(10) Patent No.: US 11,156,229 B2
(45) Date of Patent: Oct. 26, 2021

(54) LIVESTOCK BLOWER APPARATUS

(71) Applicant: Xceed Engineering LLC, Churubusco, IN (US)

(72) Inventors: Jermiah Johnson, Churubusco, IN (US); Brian Birk, Goshen, IN (US); Lance Harris, Albion, IN (US); Mike Ott, Albion, IN (US)

(73) Assignee: Xceed Engineering LLC, Churubusco, IN (US)

( * ) Notice: Subject to any disclaimer, the term of this patent is extended or adjusted under 35 U.S.C. 154(b) by 231 days.

(21) Appl. No.: 16/406,570

(22) Filed: May 8, 2019

(65) Prior Publication Data

US 2020/0352132 A1 Nov. 12, 2020

(51) Int. Cl.
| | |
|---|---|
| *F04D 29/58* | (2006.01) |
| *A01K 13/00* | (2006.01) |
| *F04D 25/16* | (2006.01) |
| *F04D 25/06* | (2006.01) |
| *F04D 29/70* | (2006.01) |
| *F04D 29/40* | (2006.01) |

(52) U.S. Cl.
CPC ........ *F04D 29/5806* (2013.01); *A01K 13/001* (2013.01); *F04D 25/06* (2013.01); *F04D 25/166* (2013.01); *F04D 29/403* (2013.01); *F04D 29/584* (2013.01); *F04D 29/703* (2013.01)

(58) Field of Classification Search
CPC ...... F04D 25/06; F04D 25/082; F04D 25/086; F04D 25/16–166; F04D 29/403; F04D 29/5806–582; F04D 29/584; F04D 29/703; A01K 13/001

USPC .............. 417/234, 368, 423.5, 423.8, 423.9, 417/423.14; 15/344; 415/101, 102; 119/606
See application file for complete search history.

(56) References Cited

U.S. PATENT DOCUMENTS

| | | | | |
|---|---|---|---|---|
| 1,255,662 | A | | 2/1918 | Sullivan |
| 1,375,482 | A | * | 4/1921 | Bartlett ................. F04D 25/166 |
| | | | | 417/350 |

(Continued)

FOREIGN PATENT DOCUMENTS

| | | | | |
|---|---|---|---|---|
| DE | 1111332 B | * | 7/1961 | ........... F04D 25/082 |
| EP | 1850012 A1 | * | 10/2007 | ......... F04D 29/4213 |

(Continued)

*Primary Examiner* — Alexander B Comley
(74) *Attorney, Agent, or Firm* — George Pappas; Barrett MoNagny LLP

(57) ABSTRACT

A livestock blower apparatus for blowing air through a flexible hose onto an animal. A pair of blower units are enclosed within an interior space of a housing. The blower units are adapted to draw air through housing inlet openings and force it through a Y-shaped conduit out through a housing outlet opening without the air coming in contact with the housing interior space. A cooling fan is provided at a housing cooling inlet opening and blows air into the housing interior space. Another cooling fan is provided at a housing cooling outlet opening and draws/blows air out from within the housing interior space. The blower units are thereby protected from the elements and noise generated by them is muffled by the housing, and the blower units are cooled for minimizing the heat that may be transferred to the air being blown onto the animal.

3 Claims, 15 Drawing Sheets

(56) References Cited

U.S. PATENT DOCUMENTS

| | | | | |
|---|---|---|---|---|
| 2,294,586 A * | 9/1942 | Troller | F04D 25/082 | 417/368 |
| 2,822,123 A * | 2/1958 | Cole | H02K 9/24 | 417/423.2 |
| 4,120,616 A * | 10/1978 | Dwyer | F04D 25/082 | 15/326 |
| D257,904 S | 1/1981 | Hamm, Jr. | | |
| 4,518,325 A * | 5/1985 | Kingston | A61H 33/028 | 417/368 |
| 4,644,606 A * | 2/1987 | Luerken | A01D 51/00 | 15/330 |
| 4,902,203 A * | 2/1990 | Sager | F04D 29/424 | 415/176 |
| 4,934,069 A | 6/1990 | Kagi | | |
| 4,977,690 A * | 12/1990 | Davis, Jr. | F26B 21/001 | 119/606 |
| 5,216,822 A * | 6/1993 | Madiedo | A45D 20/12 | 34/82 |
| 5,251,281 A * | 10/1993 | Fravel, Jr. | F24H 3/0423 | 126/271.1 |
| 5,269,665 A * | 12/1993 | Sadler | A47L 5/14 | 417/363 |
| 5,388,956 A * | 2/1995 | Pla | F04D 25/166 | 415/1 |
| 5,478,214 A * | 12/1995 | Howarth | F04D 25/166 | 415/60 |
| 5,567,127 A * | 10/1996 | Wentz | A47L 7/00 | 415/119 |
| 5,638,574 A * | 6/1997 | Haupt | A01G 20/47 | 15/330 |
| 5,926,972 A * | 7/1999 | Di Peso | A01K 13/001 | 34/128 |
| 6,004,093 A * | 12/1999 | Ishikawa | A47L 5/12 | 415/98 |
| 6,407,918 B1 * | 6/2002 | Edmunds | H05K 7/20581 | 165/104.34 |
| 6,896,478 B2 * | 5/2005 | Botros | F04D 25/166 | 415/101 |
| 6,990,825 B2 * | 1/2006 | Hansen | F04D 17/04 | 62/285 |
| RE40,196 E * | 4/2008 | Sullivan | A01K 13/001 | 119/600 |
| 7,431,073 B2 * | 10/2008 | Radke | B60K 11/08 | 165/119 |
| 7,529,088 B2 * | 5/2009 | Chiu | F04D 29/161 | 361/695 |
| 7,540,722 B2 * | 6/2009 | Nishikawa | F04D 29/281 | 417/312 |
| 7,775,180 B2 | 8/2010 | Denison et al. | | |
| 8,262,370 B2 * | 9/2012 | Kageback | F04D 25/02 | 417/371 |
| 8,333,547 B2 * | 12/2012 | Hsu | F04D 25/166 | 415/60 |
| 8,631,767 B1 * | 1/2014 | Sack | A01K 13/00 | 119/606 |
| 8,721,298 B2 * | 5/2014 | Tanimoto | F04D 25/084 | 417/234 |
| 8,760,017 B2 * | 6/2014 | Henke | H02K 9/06 | 310/62 |
| 8,767,400 B2 * | 7/2014 | Dickinson | F04D 25/166 | 361/695 |
| D792,662 S | 7/2017 | Chen | | |
| 2006/0013712 A1 * | 1/2006 | Lee | F04D 31/00 | 417/423.7 |
| 2008/0298984 A1 * | 12/2008 | Barberis | F04B 39/06 | 417/366 |
| 2011/0308777 A1 * | 12/2011 | O'Connor | F04D 27/004 | 165/121 |
| 2012/0031347 A1 * | 2/2012 | Denison | A01K 13/001 | 119/606 |
| 2019/0113042 A1 * | 4/2019 | Diehl | F04D 25/06 | |

FOREIGN PATENT DOCUMENTS

| | | | | |
|---|---|---|---|---|
| FR | 2523696 A1 * | 9/1983 | | F24F 7/025 |
| FR | 2798968 A1 * | 3/2001 | | F04D 25/082 |
| FR | 3035457 A1 * | 10/2016 | | F24F 7/06 |
| FR | 3080440 A1 * | 10/2019 | | F04D 29/5806 |
| WO | 2011/115468 A1 | 9/2011 | | |
| WO | WO-2011115468 A1 * | 9/2011 | | A45D 20/08 |

* cited by examiner

LIVESTOCK BLOWER APPARATUS

BACKGROUND OF THE INVENTION

1. Field of the Invention

The present invention relates to the field of blowers used for blowing and directing air onto animals/livestock for cooling and drying the animals and for removing dirt from and grooming the animals.

2. Background

Animal/livestock blowers are known and are commonly used primarily at events such as shows, sales and/or auctions to groom the animal by drying and/or removing dirt/debris and thereby enhancing the appearance of the skin/hair of the animal. Hand held self-contained blowers have been used for this purpose. However, they tend to be cumbersome and heavy, they do not provide a sufficient volume of air, especially for larger animals, and can spook the animal by the noise they generate. Separate air blower apparatus have therefore been devised which can be located away from the animal. An air hose is used for delivering the air from the blower apparatus to and around the animal as needed or desired. Examples of such known blower apparatus are shown and described in Chen, U.S. D792,662; Sack, U.S. Pat. No. 8,631,767; Denison et at., US 2012/0031347; Davis Jr., U.S. Pat. No. 4,977,690; and, Di Peso, U.S. Pat. No. 5,926,972.

The prior air blower apparatus, however, typically intend to or otherwise inadvertently heat the air being delivered. This is undesirable, especially in hot weather, when cool air is preferable for cooling and calming the animal. The life of some of the prior air blower apparatus is also often shortened due to dirt and debris fouling the blower motor(s).

Accordingly, a need exists for an improved livestock blower apparatus which overcomes the foregoing and other disadvantageous of prior livestock blower apparatus, and which delivers relatively cooler air to the animal and which protects the blower(s) and increases the life of the apparatus.

SUMMARY OF THE INVENTION

The present invention overcomes disadvantageous of prior livestock blower apparatus by isolating the air being drawn into the blower apparatus and being delivered onto the animal from the motor and other components of the apparatus which function to draw and deliver/force the air to the animal; enclosing and protecting the motor and other components from the elements; and, cooling the motor and components to minimize the heat that may be transferred from the motor and other components to the air being delivered onto the animal.

In one form thereof, the present invention is directed to a blower apparatus for blowing air onto animals and includes a blower housing defining an enclosed interior space and having a blower air inlet opening, a blower air outlet opening, a cooling air inlet opening and a cooling air outlet opening. A blower unit is provided including a fan selectively driven by an electric motor, wherein the fan includes a fan housing having an air inlet and an air outlet and wherein the electric motor is located outside of the fan housing. The blower unit is located within the blower housing interior space whereby the blower unit is protected by the blower housing. The fan housing inlet communicates with the blower housing air inlet opening and the fan housing outlet communicates with the blower housing air outlet opening, whereby air is drawn in through the blower housing air inlet opening and forced out through the blower housing air outlet opening without contacting air within the blower housing interior space. A cooling fan is provided at one of the blower housing cooling air inlet opening or blower housing cooling air outlet opening for drawing air into the blower housing interior space through the blower housing cooling air inlet and forcing air out from within the blower housing interior space through the blower housing cooling air outlet opening, whereby heat generated by the blower unit is removed from the blower housing interior space and the blower unit is cooled.

In another form thereof, the present invention is directed to a blower apparatus for blowing air onto animals and includes a blower housing defining an enclosed interior space and having first and second blower air inlet openings, a blower air outlet opening, a cooling air inlet opening and a cooling air outlet opening. First and second blower units are provided wherein each blower unit includes a fan selectively driven by an electric motor, wherein the fan includes a fan housing having an air inlet and an air outlet and wherein the electric motor is located outside of the fan housing. The first and second blower units are located within the blower housing interior space whereby the blower units are protected by the blower housing. The first blower unit fan inlet communicates with the first blower housing air inlet opening. The second blower unit fan inlet communicates with the second blower housing air inlet opening. Both the first blower unit fan outlet and the second blower unit fan outlet communicate with the blower housing air outlet opening, whereby air is drawn in through the blower housing first and second air inlet openings and is forced out through the blower housing air outlet opening without contacting air within the blower housing interior space. A cooling fan is provided at one of the blower housing cooling air inlet opening or blower housing cooling air outlet opening for drawing air into the blower housing interior space through the blower housing cooling air inlet and forcing air out from within the blower housing interior space through the blower housing cooling air outlet opening, whereby heat generated by the first and second blower units is removed from the blower housing interior space and the first and second blower units are cooled.

Preferably, a Y-shaped conduit is provided having: a first opening communicating with the first blower unit fan outlet; a second opening communicating with the second blower unit fan outlet; and, a third opening communicating with the blower housing air outlet opening.

The first and second blower units are preferably tangential bypass flow motor fans.

The apparatus may further include an elongate flexible air hose connected to the blower housing air outlet opening at its one terminal end thereof and having a reduced opening nozzle at its other terminal end thereof.

Also preferably, a first air filter selectively placeable over the first blower housing air inlet opening and a second air filter selectively placeable over the second blower housing air inlet opening.

A second cooling fan is also preferably provided at the other one of the blower housing cooling air inlet opening or blower housing cooling air outlet opening, whereby the cooling fan at the blower housing cooling air inlet forces air into the housing interior space and the cooling fan at the blower housing cooling air outlet forces air out from within the housing interior space.

The blower housing preferably comprises a pair of integrally formed halves secured to each other with fasteners and an integrally formed handle.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
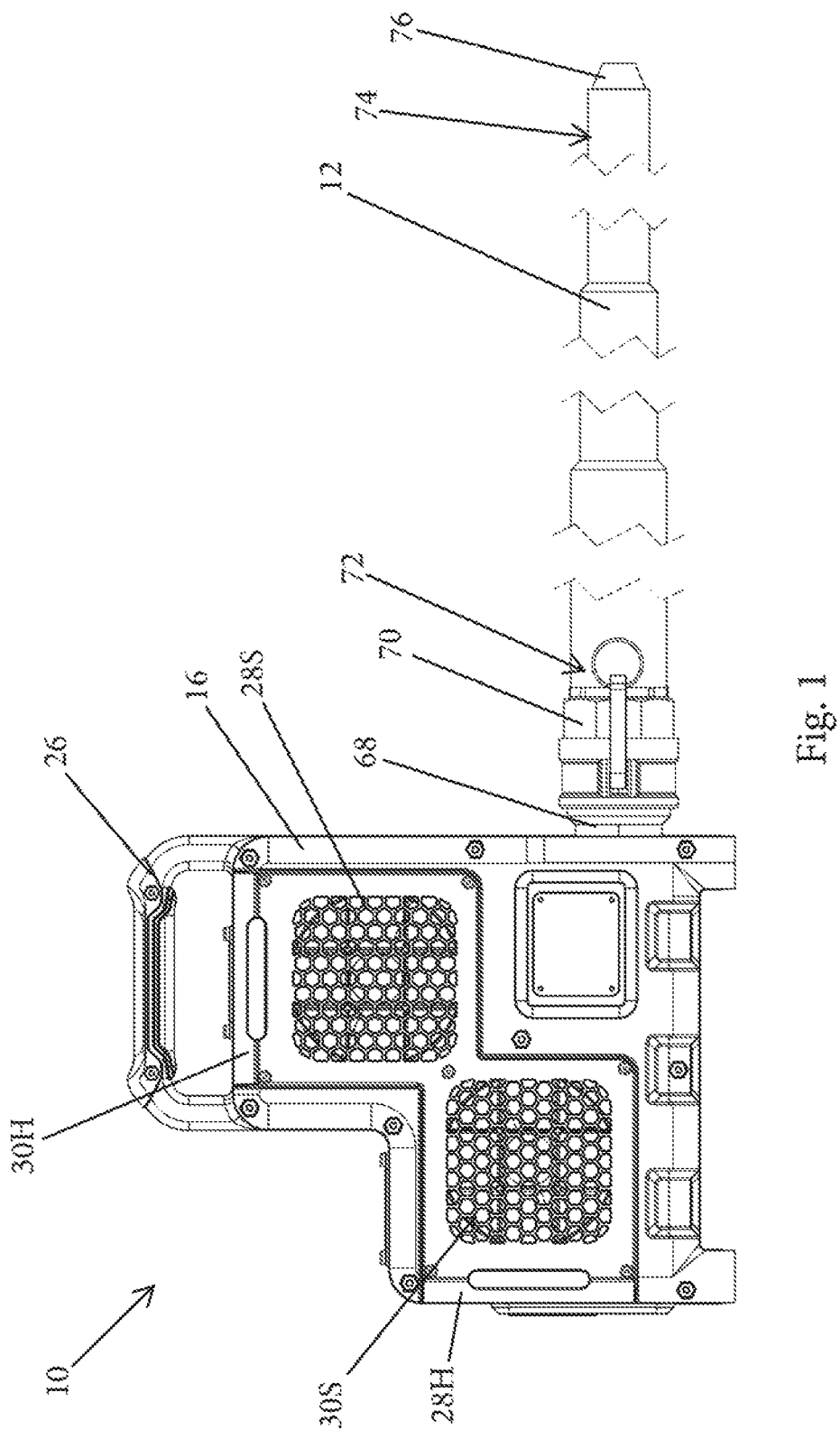
FIG. 1 is a left side elevation view of a livestock blower apparatus constructed in accordance with the principles of the present invention and showing a hose connected thereto for delivering/blowing air onto a remotely located animal.
Figure 2:
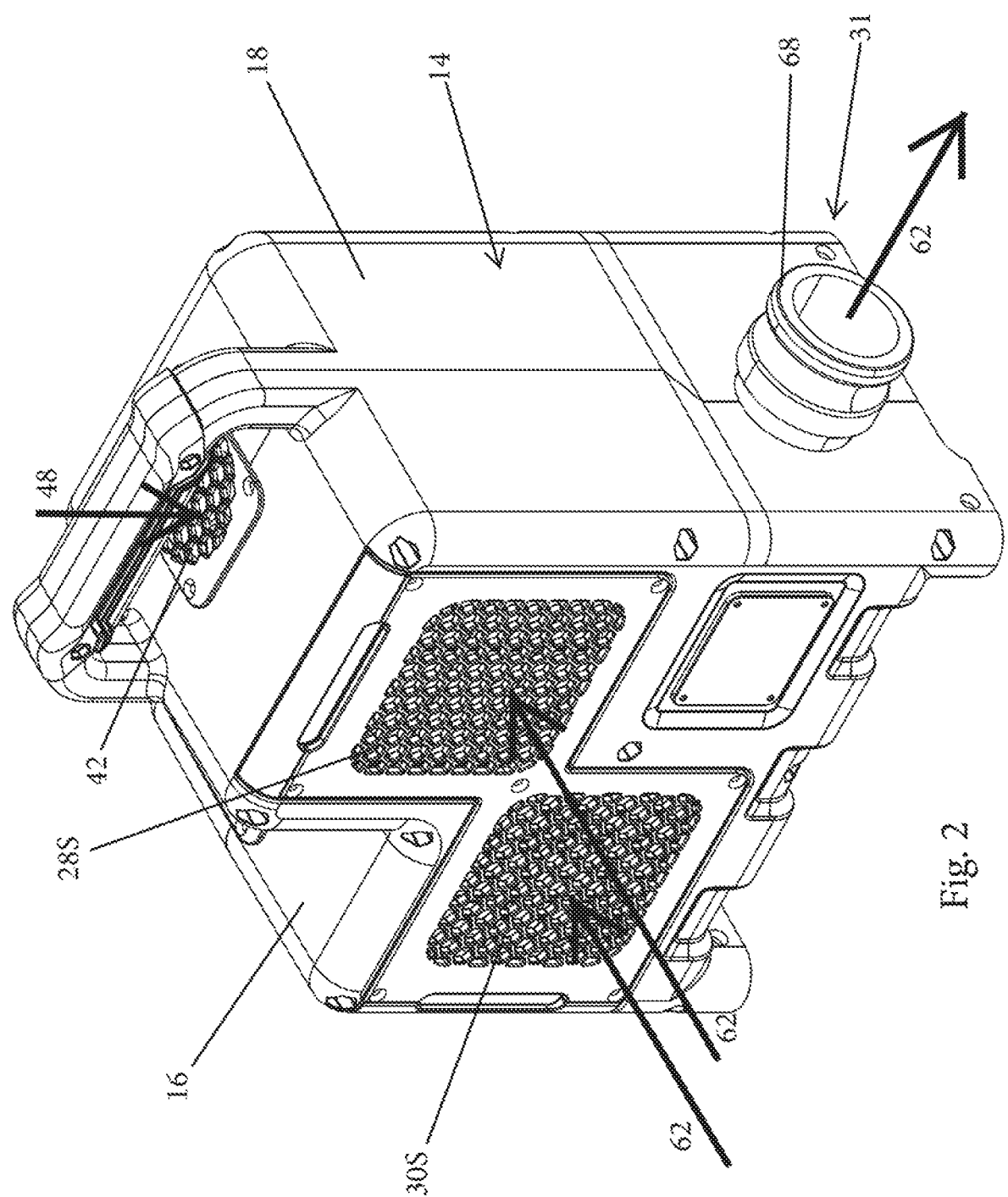
FIG. 2 is a perspective view of the blower apparatus shown in FIG. 1 and showing the front, left side and top thereof.
Figure 3:
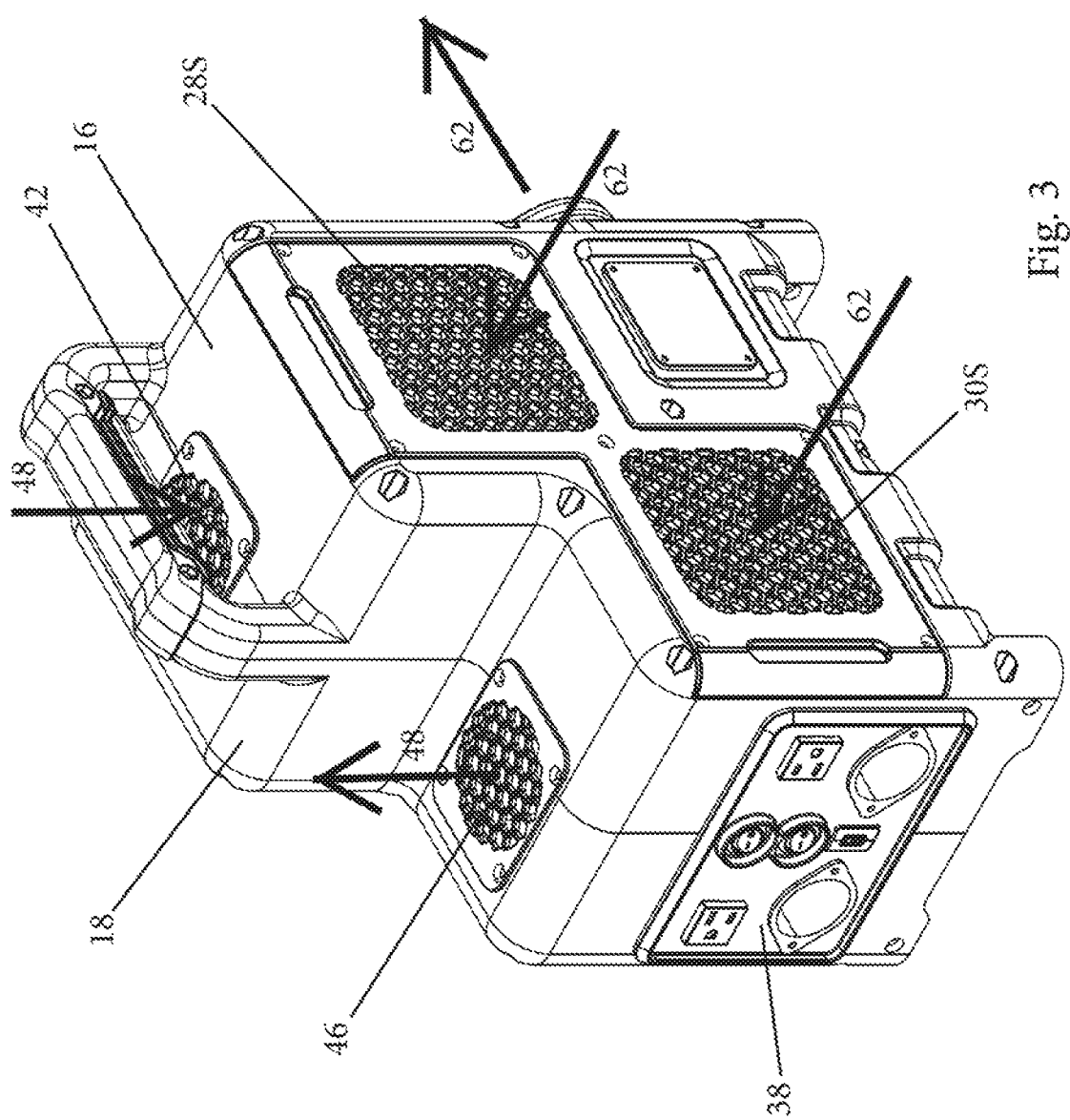
FIG. 3 is another perspective view of the blower apparatus shown in FIG. 1 and showing the rear, left side and top thereof.
Figure 4:
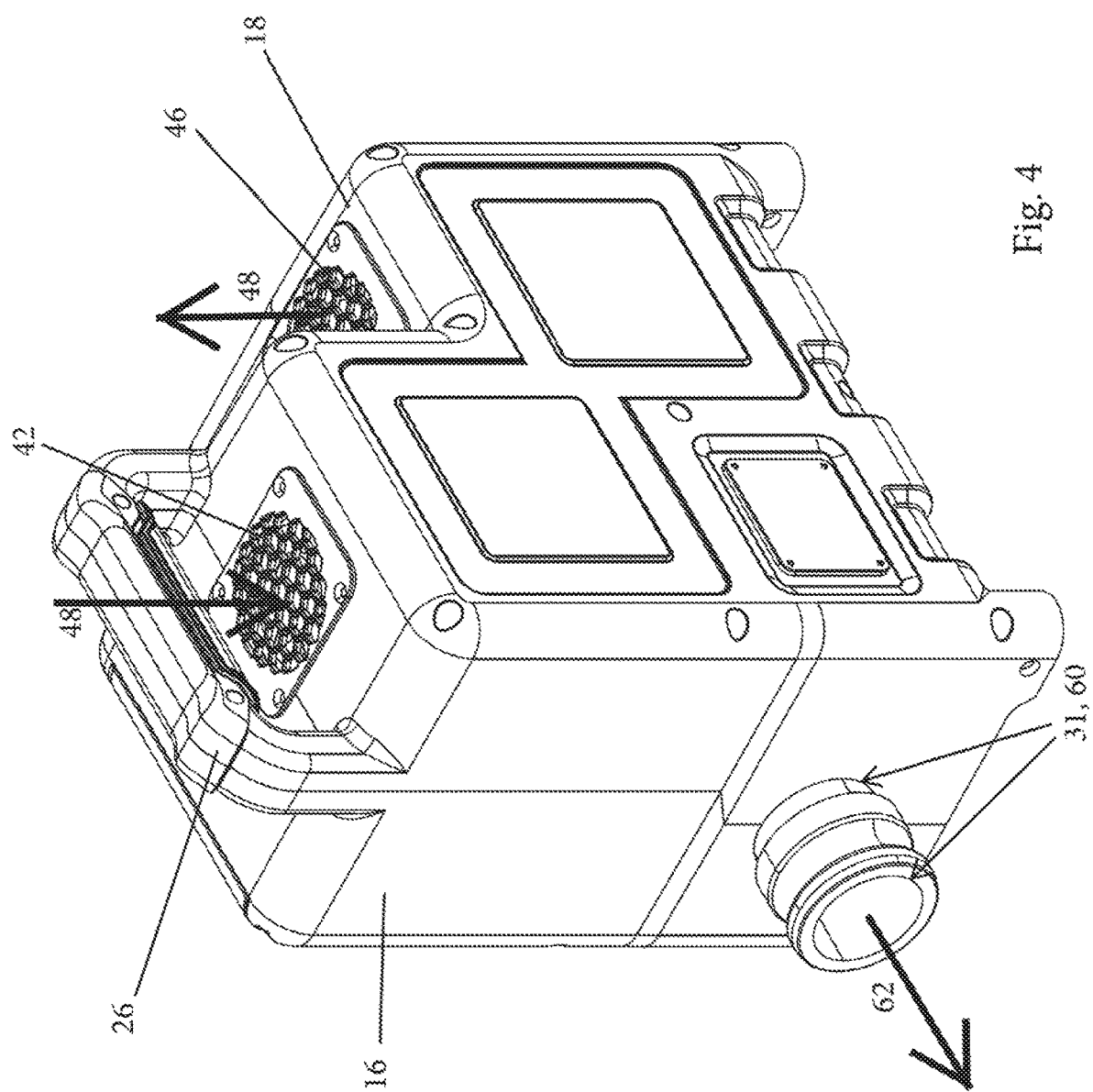
FIG. 4 is another perspective view of the blower apparatus shown in FIG. 1 and showing the front, right side and top thereof.
Figure 5:
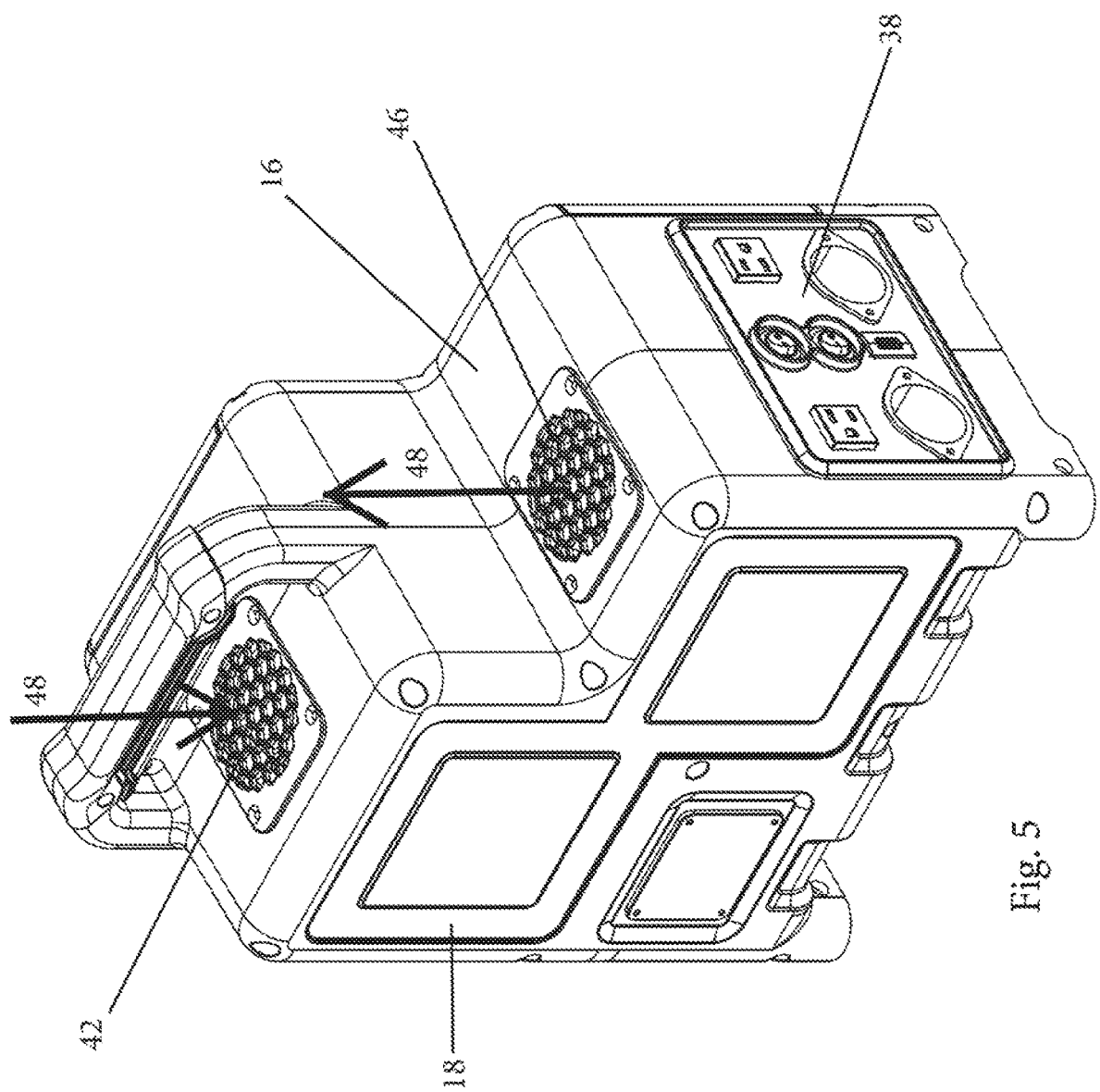
FIG. 5 is another perspective view of the blower apparatus shown in FIG. 1 and showing the rear, right side and top thereof.
Figure 6:
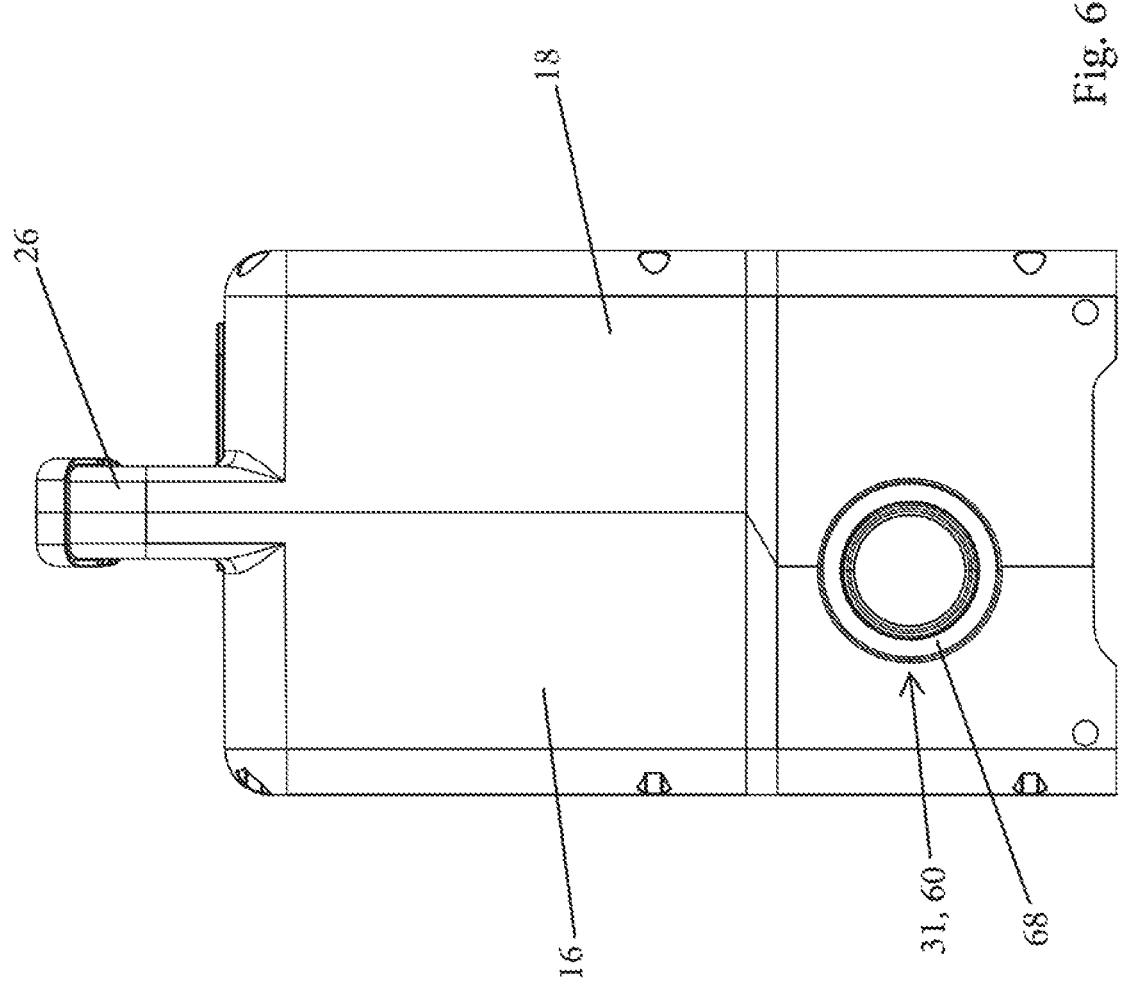
FIG. 6 is a front elevation view of the blower apparatus shown in FIG. 1.
Figure 7:
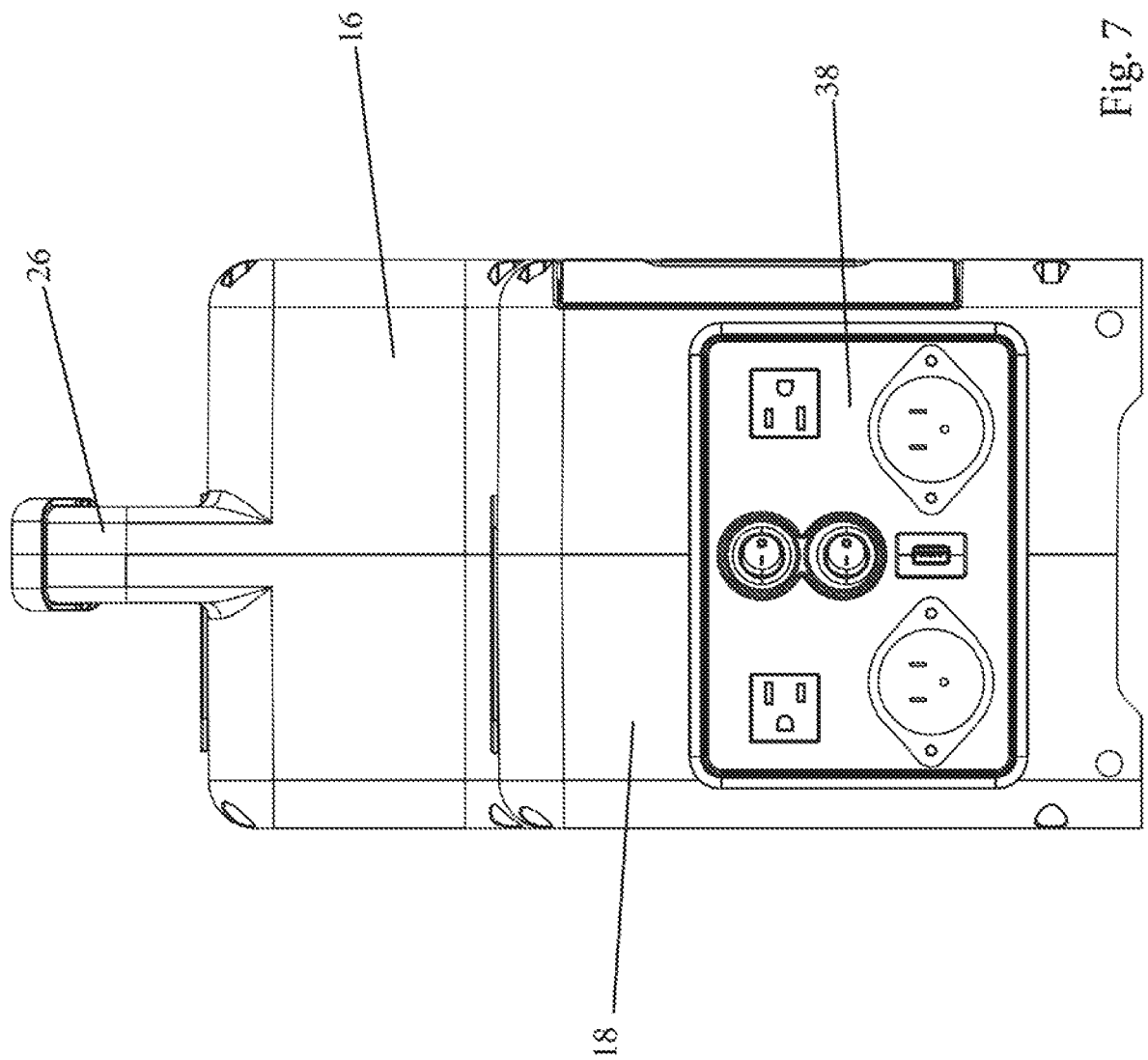
FIG. 7 is a rear elevation view of the blower apparatus shown in FIG. 1.
Figure 8:
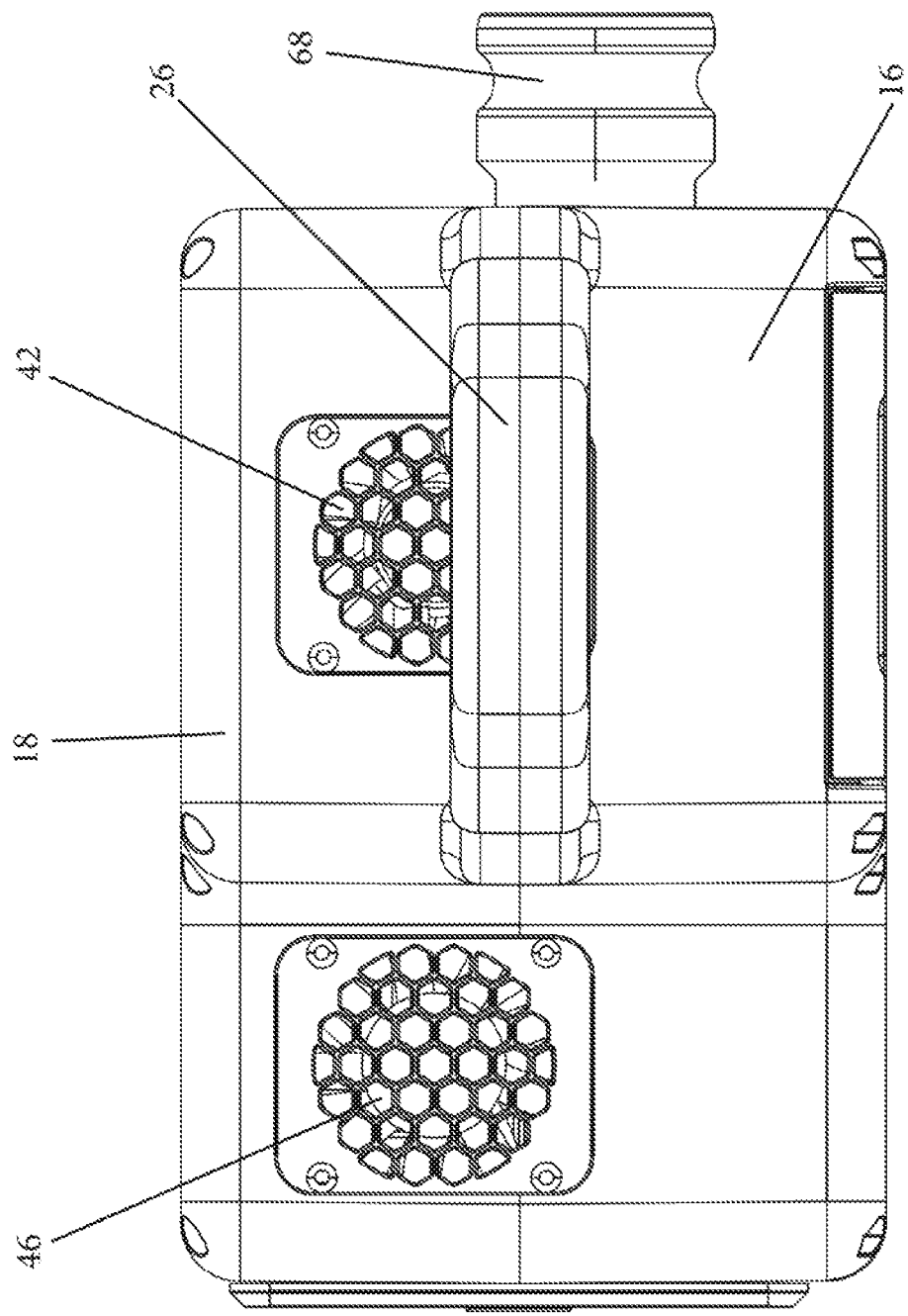
FIG. 8 is a top plan view of the blower apparatus shown in FIG. 1.
Figure 9:
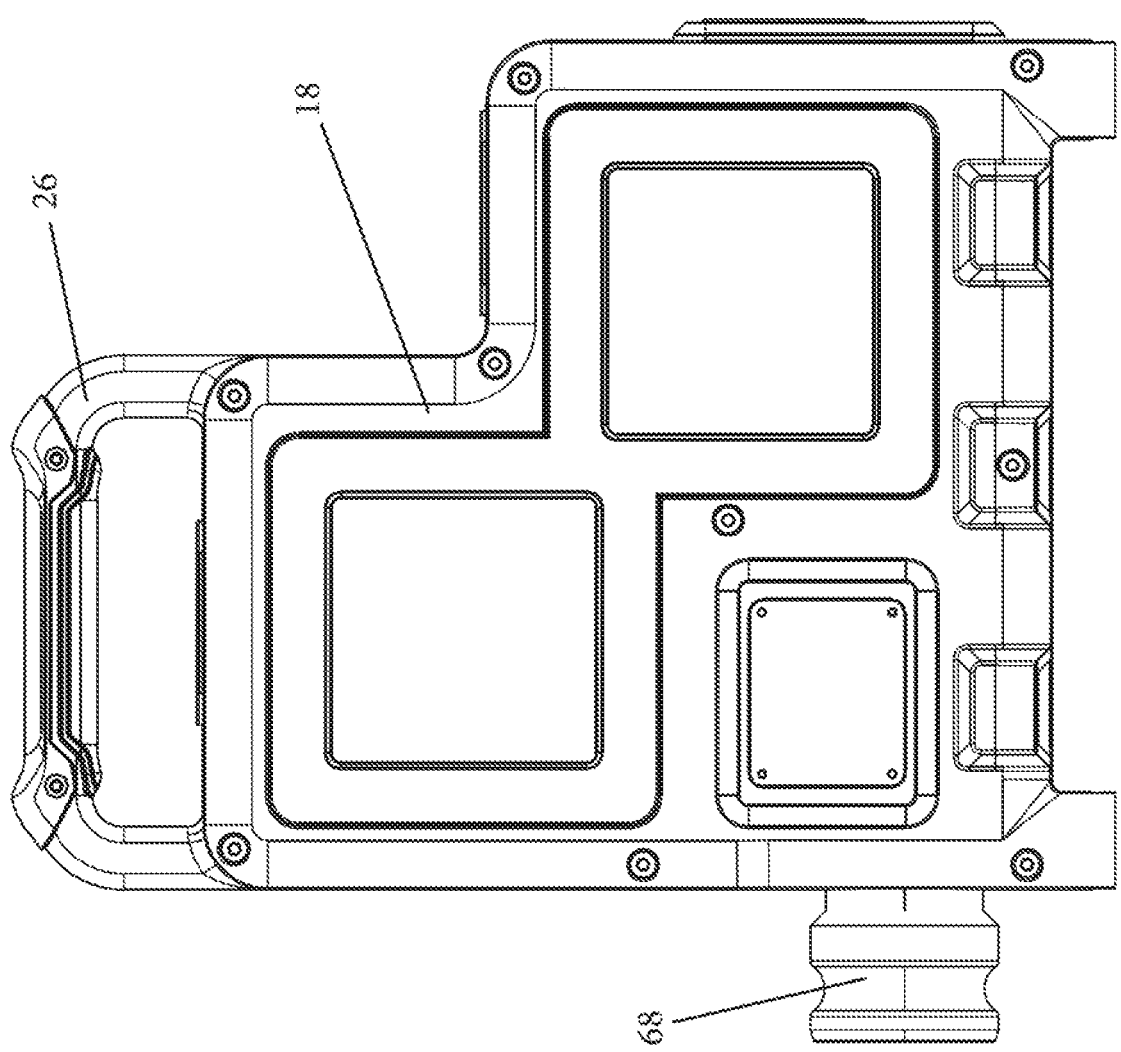
FIG. 9 is a right side elevation view of blower apparatus shown in FIG. 1 showing the right housing half.
Figure 10:
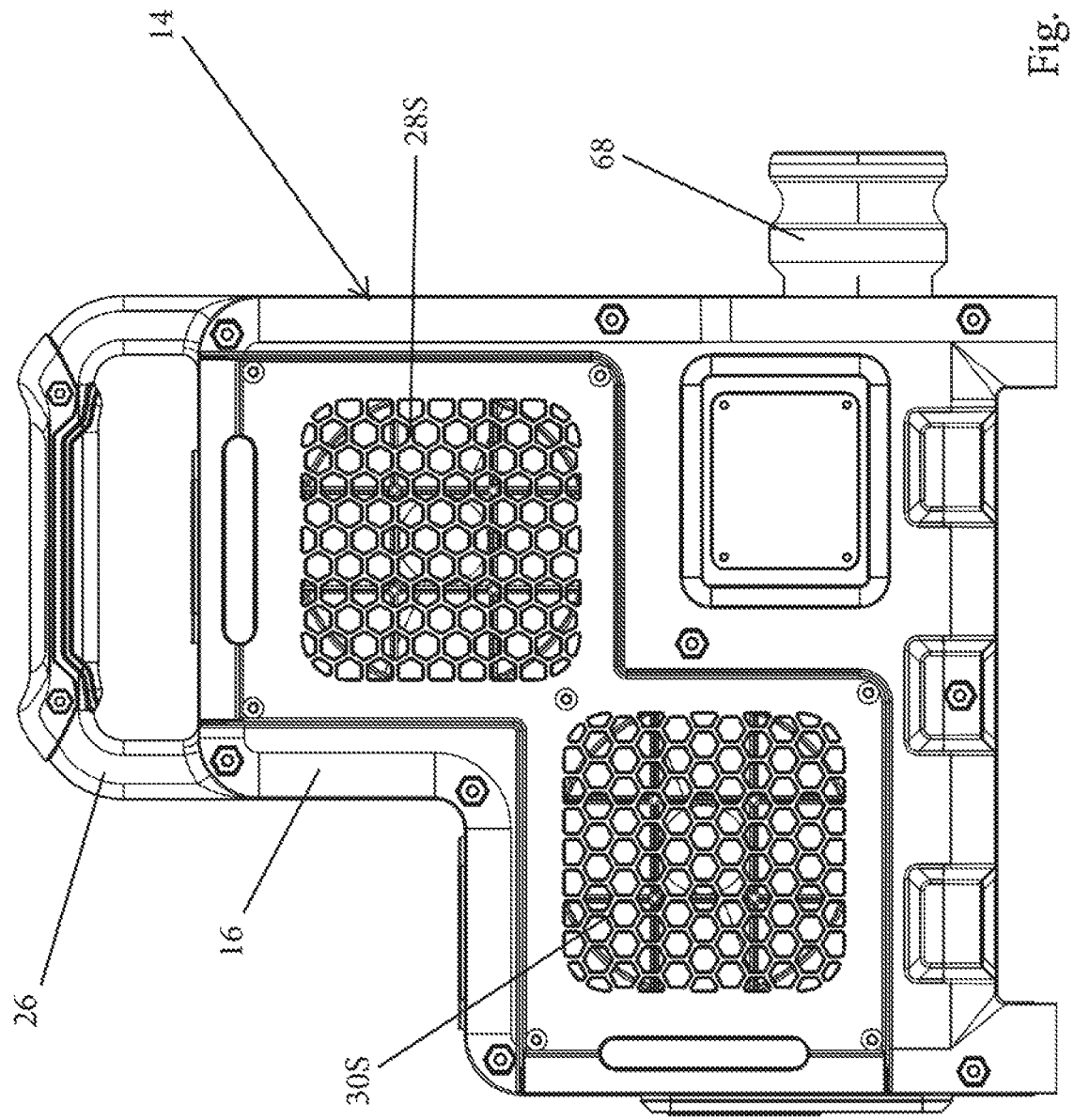
FIG. 10 is a left side elevation view of blower apparatus shown in FIG. 1 showing the left housing half.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Referring initially to FIG. 1, a livestock blower apparatus constructed in accordance with the principles of the present invention is shown and designated by the numeral 10. Apparatus 10, as more fully described herein below, is adapted to blow/force air through a flexible air hose 12 for thereby directing and blowing the air onto an animal for cooling and drying the animal and for removing dirt from and grooming the animal.

Figure 11:
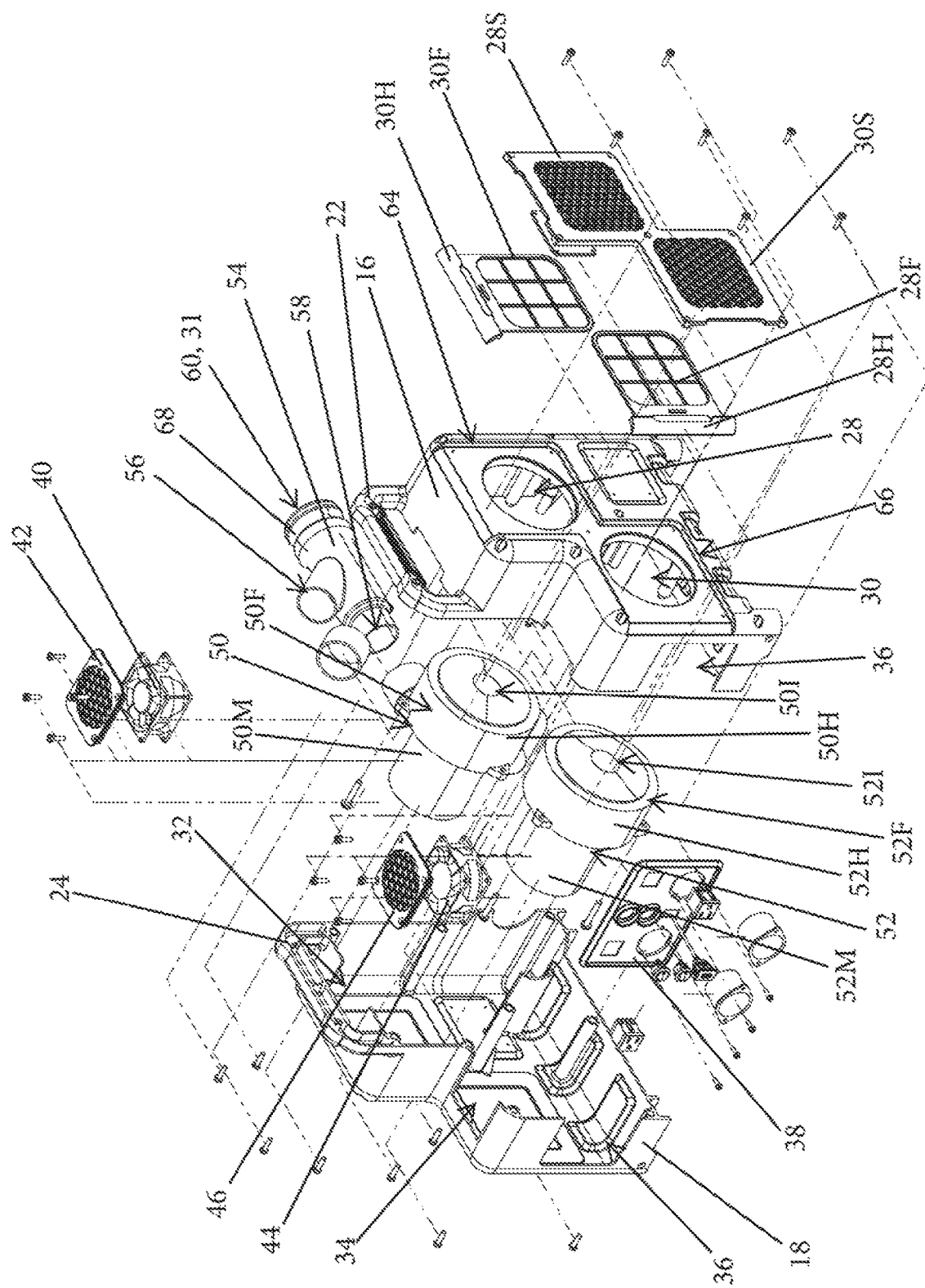
FIG. 11 is an exploded view of the blower apparatus shown in FIG. 1 depicting the assembly of the several components thereof.
Figure 12:
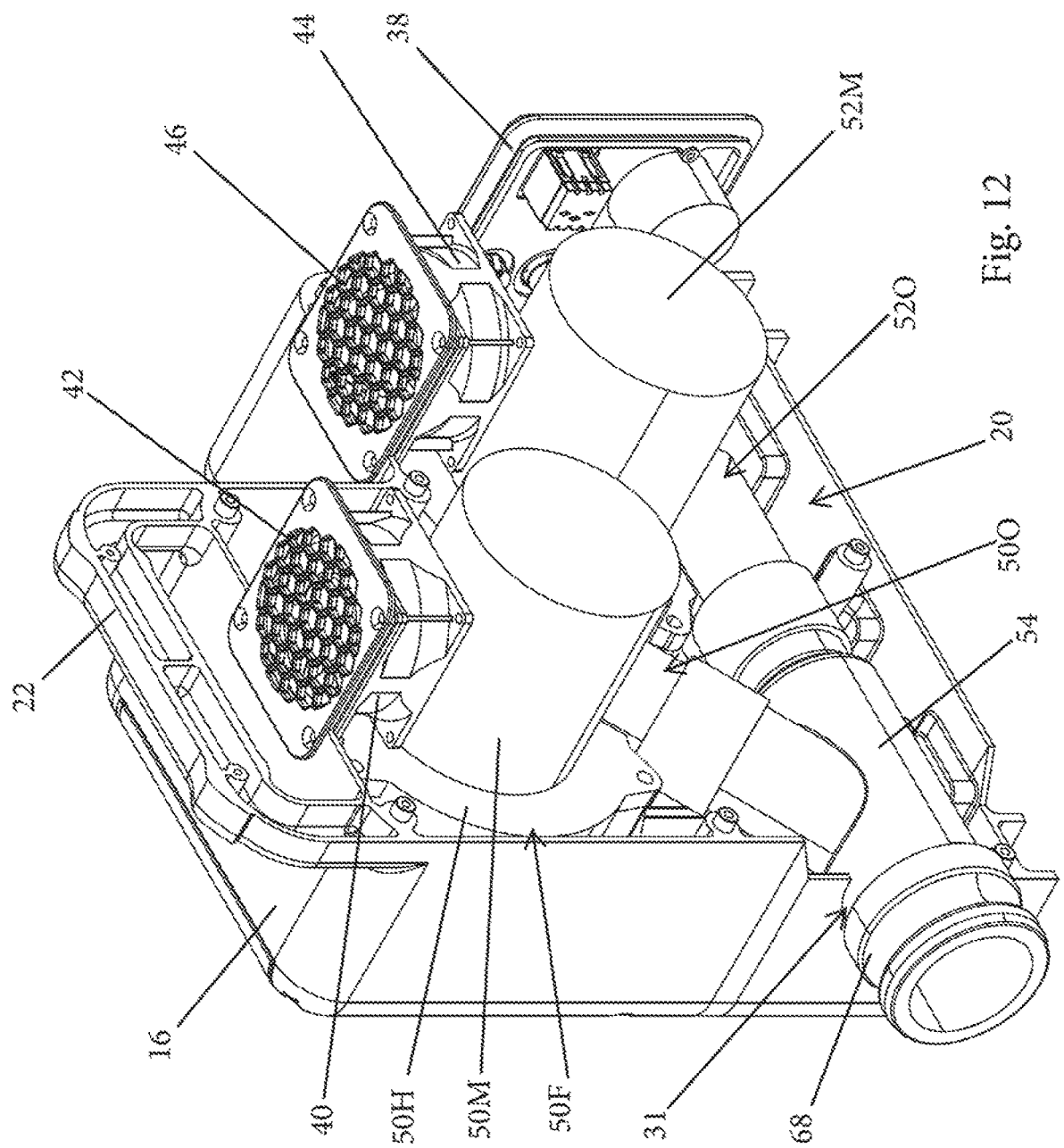
FIG. 12 is a perspective view similar to FIG. 4 with the right housing half removed.
Figure 13:
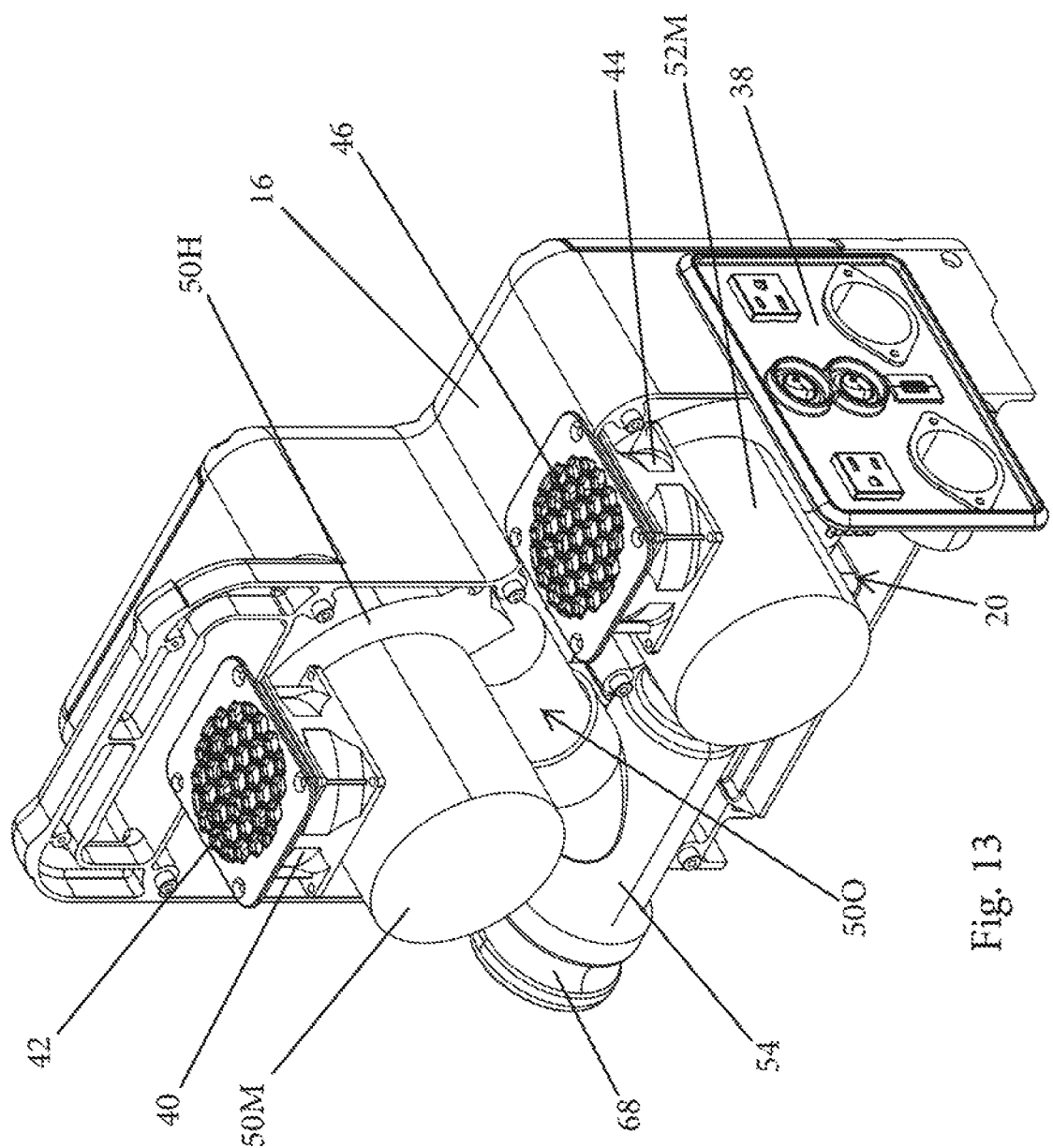
FIG. 13 is a perspective view similar to FIG. 5 with the right housing half removed.
Figure 14:
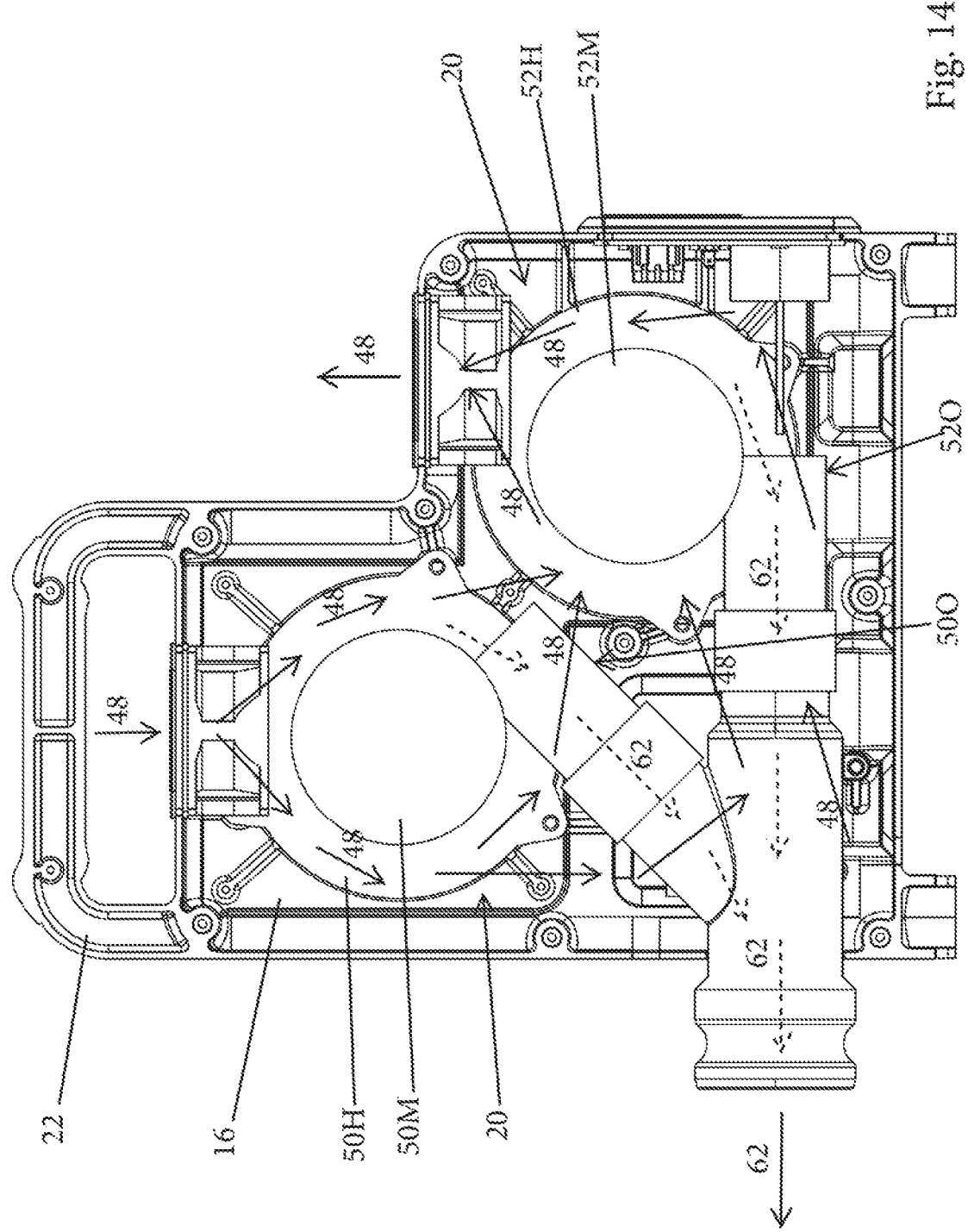
FIG. 14 is a right side elevation view similar to FIG. 9 with the right housing half removed; and, FIG. 15 is a perspective view similar to FIG. 3 and depicting the air filters slidably insertable into a slot for placing them over the blower housing air inlet openings.
Figure 15:
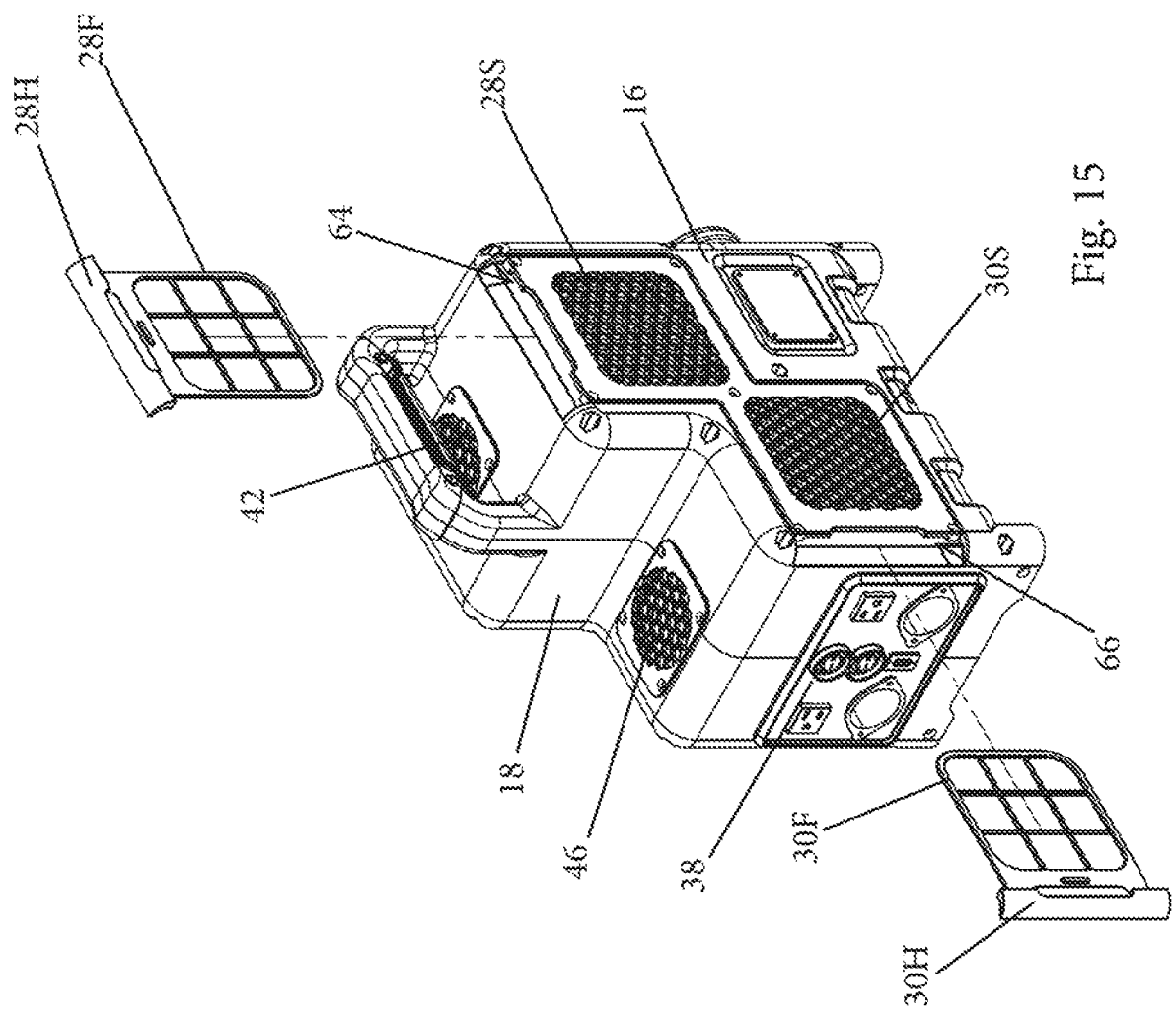

Apparatus 10 includes a blower housing 14 which, as best seen in FIG. 11, is constructed with a pair of plastic molded housing halves, namely, left housing half 16 and right housing half 18. Left housing half 16 and right housing half 18 are secured to each other with fasteners (not numbered). Housing 14 thereby defines an enclosed interior space 20. Left and right housing halves 16, 18 include respective integrally formed handle halves, namely, left handle half 22 and right handle half 24. When the left and right housing halves 16, 18 are secured to each other, the left and right handle halves 22, 24 form a carrying handle 26.

The left housing half 16 includes first and second blower air inlet openings 28, 30. When the left and right housing halves 16, 18 are secured to each other, the housing 14 forms and includes a blower air outlet opening 31, a cooling air inlet opening 32, a cooling air outlet opening 34 and a control panel opening 36. A control panel 38 is provided for mounting the control components and controlling the blower apparatus 10 as needed or desired. Control panel 38 is secured to the housing 14 at the control panel opening 36 and thereby also fills/seals the opening 36.

A cooling axial fan 40 is provided at the housing cooling air inlet opening 32 and is adapted to blow/force air into the housing interior space 20 when energized. A screen 42 is mounted over the cooling axial fan 40 with fasteners (not numbered) for preventing dirt and debris from being drawn into the housing interior space 20 and for safety purposes. A cooling axial fan 44 is provided at the housing cooling air outlet opening 34 and is adapted to blow/force air out from within the housing interior space 20 when energized. A screen 46 is mounted over the cooling axial fan 44 with fasteners (not numbered) primarily for safety purposes and also for preventing dirt and debris from inadvertently entering the housing interior space 20. As should now be appreciated, a cooling air flow path depicted in the drawings with arrows 48 is formed with cooling axial fans 40, 42 forcing ambient air through the housing cooling air inlet opening 32 into the housing interior space 20 and around the blower units 50, 52 and other components within the interior space 20, and then out from the interior space 20 through the housing cooling air outlet 34. As should also be appreciated, although it is preferable to use both cooling axial fans 40, 42 for maximizing the velocity and volume of air traversing the cooling air flow path 48, it is contemplated that only one of the cooling axial fans 40, 42 can be used if a lower velocity and a lesser volume of air is found to be sufficient.

Blower units 50, 52 are provided and are located within the housing interior space 20. Blower units 50, 52 are mounted onto the left housing half 16 with fasteners (not numbered). Blower units 50, 52 are preferably tangential bypass flow motor fans such as model No. 122525-00 available from AMETEK Dynamic Fluid Solutions, 100 East Erie St., Kent, Ohio 44240. Each of the blower units 50, 52 are made up of and include a fan 50F, 52F which is selectively driven by an electric motor 50M, 52M. The fans 50F, 52F include a fan housing 50H, 52H having an air inlet 50I, 52I and an air outlet 50O, 52O. The electric motors 50M, 52M are located outside of the fan housing 50H, 52H. That is, substantially only the motor shaft extends into the fan housing 50H, 52H for rotatably driving the impeller (not shown) as is common in tangential bypass flow motor fans. Accordingly, air traveling through the fan housing 50H, 52H is effectively sealed from the motor 50M, 52M. Motors 50M, 52M may be provided with internal cooling fans for discarding heat created by the motors (not shown) as is also common in tangential bypass flow motor fans.

The blower units 50, 52 are mounted onto the left blower housing 16 with the blower fan inlets 50I, 52I being aligned with and communicating with respective blower housing inlet openings 28, 30 whereby, when the blower units are energized, air is drawn into the fans 50F, 52F through the respective blower housing inlet openings 28, 30 and respective fan housing inlets 50I, 52I. The air drawn into the blower units 50, 52 is forced out through respective blower fan outlets 50O, 52O and is directed to and discharged out of the blower housing 14 through the blower air outlet opening 31. More particularly and preferably, a Y-shaped conduit 54 is provided and is mounted within the housing 14. Y-shaped conduit 54 has a first opening 56 connected to and communicating with the blower unit 50 fan outlet 50O, a second opening 58 connected to and communicating with the blower unit 52 fan outlet 52O and, a third opening 60 extending through/communicating with the blower housing air outlet opening 31. Accordingly, the Y-shaped conduit serves to converge the air blown/forced out of the blower fan outlets 50O, 52O into a single air stream which is discharged through the Y-shaped conduit third opening 60 and the blower housing air outlet opening 31.

Screens 28S, 30S are mounted over the respective blower air inlet openings 28, 30 with fasteners (not numbered) for preventing dirt and debris from being drawn into the respective blower unit fans 50F, 52F and for safety purposes. Screens 28S, 30S are preferably integrally formed together as shown for minimizing costs and aesthetic appearance purposes. Additionally, air filters 28F, 30F are selectively placed over the respective blower unit air inlet openings 28, 30 by grasping the respective handle 28H, 30H thereof and sliding into and out of respective slots 64, 66 formed between the screens 28S, 30S and the left housing half 16. Filters 28F, 30F further prevent dirt and debris from being drawn into the respective blower unit fans 50F, 52F.

As should now be appreciated, a blower air flow path depicted in the drawings with arrows 62 is formed through the housing interior space 20 with the blower units 50, 52 drawing air in through the blower housing inlet openings 28, 30 and forcing it into the Y-shaped conduit 54 and then out of through the blower housing outlet 31. Also, the air traveling along the blower air flow path 62 does not contact/ is not exposed to the blower housing interior space 20 and hence does not communicate with the air traveling along the cooling air flow path 48. Accordingly, the blower units 50, 52 are protected from the elements and are safely located within the housing 14. Additionally, the noise created by blower units 50, 52 is muffled by the housing 14.

The apparatus 10 is used by directing the air blown/forced out of the blower housing outlet 31 through a flexible air hose 12 and thereby directing and blowing the air onto an animal for cooling and drying the animal and for removing dirt from and grooming the animal. Preferably, a male quick connect pipe coupling 68 is provided at the Y-shaped conduit third opening 60 and the hose 12 is provided with a corresponding female quick connect pipe coupling 70 at one of its terminal ends 72 for thereby quickly and easily connecting the hose terminal end 70 to the conduit third opening 60/blower housing outlet opening 31. The air hose 12 other terminal end 74 is provided with a reduced opening nozzle 76 for increasing the velocity of the air being discharged therethrough and onto an animal.

While this invention has been described as having an exemplary design, the present invention may be further modified within the spirit and scope of this disclosure. This application is therefore intended to cover any variations, uses, or adaptations of the invention using its general principles.

What is claimed is:

1. A blower apparatus for blowing air onto animals comprising:
   a housing defining an interior space and having first and second working air inlet openings, a working air outlet opening, a cooling air inlet opening and a cooling air outlet opening,
   first and second blower units wherein each blower unit comprises a fan selectively driven by an electric motor, wherein said fan includes a fan housing having an air inlet and an air outlet and wherein said electric motor is located outside of the fan housing;
   said first and second blower unit motors are located within said housing interior space whereby said blower unit motors are protected by said housing;
   said first blower unit fan air inlet communicates with said housing first working air inlet opening;
   said second blower unit fan air inlet communicates with said housing second working air inlet opening;
   both said first blower unit fan air outlet and said second blower unit fan air outlet communicate with said housing working air outlet opening whereby working air is drawn in through said housing first and second working air inlet openings and is forced out through said housing working air outlet;
   a cooling fan drawing cooling air into said housing interior space through said housing cooling air inlet opening and forcing the cooling air out from within said housing interior space through said housing cooling air outlet opening; and,
   a second cooling fan drawing cooling air into said housing interior space through said housing cooling air inlet opening and forcing the cooling air out from within said housing interior space through said housing cooling air outlet opening,
   whereby the cooling air within the housing interior space does not contact the working air within the housing interior space and heat generated by said first and second blower unit motors is removed from said housing interior space and said first and second blower unit motors are cooled.

2. A blower apparatus for blowing air onto animals comprising:
   a housing defining an interior space and having first and second working air inlet openings, a working air outlet opening, a cooling air inlet opening and a cooling air outlet opening;
   first and second blower units wherein each blower unit comprises a fan selectively driven by an electric motor, wherein said fan includes a fan housing having an air inlet and an air outlet and wherein said electric motor is located outside of the fan housing;
   said first and second blower unit motors are located within said housing interior space whereby said blower unit motors are protected by said housing;
   said first blower unit fan air inlet communicates with said housing first working air inlet opening;
   said second blower unit fan air inlet communicates with said housing second working air inlet opening;
   both said first blower unit fan air outlet and second blower unit fan air outlet communicate with said housing working air outlet opening, whereby working air is drawn in through said housing first and second working air inlet openings and is forced out through said housing working air outlet;

a cooling fan drawing cooling air into said housing, interior space through said housing cooling, air inlet opening and forcing the cooling air out from within said housing interior space through said housing cooling air outlet opening, whereby the cooling air within the housing interior space does not contact the working air within the housing interior space and heat generated by said first and second blower unit motors is removed from said housing interior space and said first and second blower unit motors are cooled;

a Y-shaped conduit having: a first opening communicating with said first blower unit fan air outlet; a second opening communicating with said second blower unit fan air outlet; and, a third opening communicating with said housing working air outlet opening;

wherein said first and second blower units are tangential bypass flow motor fans; and, a second cooling fan drawing cooling air into said housing interior space through said housing cooling air inlet opening and forcing the cooling air out from within said housing interior space through said housing cooling air outlet opening.

3. A blower apparatus for blowing air onto animals comprising:

a housing defining an interior space and having first and second working air inlet openings, a working air outlet opening, a cooling air inlet opening and a cooling air outlet opening;

first and second blower units wherein each blower unit comprises a fan selectively driven by an electric motor, wherein said fan includes a fan housing having an air inlet and an air outlet and wherein said electric motor is located outside of the fan housing;

said first and second blower unit motors are located within said housing interior space whereby said blower unit motors are protected by said housing;

said first blower unit fan air inlet communicates with said housing first working air inlet opening;

said second blower unit fan air inlet communicates with said housing second working air inlet opening;

both said first blower unit fan air outlet and said second blower unit fan air outlet communicate with said housing working air outlet, whereby working air is drawn in through said housing first and second working air inlet openings and is forced out through said housing working air outlet;

a cooling fan drawing cooling air into said housing interior space through said housing cooling air inlet opening and forcing the cooling air out from within said housing interior space through said housing cooling air outlet opening, whereby the cooling air within the housing interior space does not contact the working air within the housing interior space and heat generated by said first and second blower unit motors is removed from said housing interior space and said first and second blower unit motors are cooled;

a Y-shaped conduit having: a first opening communicating with said first blower unit fan air outlet; a second opening communicating with said second blower unit fan air outlet; and, a third opening communicating with said housing working air outlet opening;

wherein said first and second blower units are tangential bypass flow motor fans;

a second cooling fan drawing cooling air into said housing interior space through said housing cooling air inlet opening and forcing the cooling air out from within said housing interior space through said housing cooling air outlet opening; and, an elongate flexible air hose connected to said housing working air outlet opening at its one terminal end thereof and having a reduced opening nozzle at its other terminal end thereof.

\* \* \* \* \*

UNITED STATES PATENT AND TRADEMARK OFFICE
CERTIFICATE OF CORRECTION

PATENT NO. : 11,156,229 B2
APPLICATION NO. : 16/406570
DATED : October 26, 2021
INVENTOR(S) : Johnson et al.

Page 1 of 1

It is certified that error appears in the above-identified patent and that said Letters Patent is hereby corrected as shown below:

On the Title Page

Item (74), delete "MoNagny" and insert -- McNagny --

In the Specification

Column 4, Line 60, delete "501" and insert -- 50I --
Column 4, Line 60, delete "521" and insert -- 52I --
Column 4, Line 60, delete "500" and insert -- 50O --
Column 4, Line 60, delete "520" and insert -- 52O --

Column 5, Line 4, delete "501" and insert -- 50I --
Column 5, Line 4, delete "521" and insert -- 52I --

Column 5, Line 9, delete "501" and insert -- 50I --
Column 5, Line 9, delete "521" and insert -- 52I --

Column 5, Line 11, delete "500" and insert -- 50O --
Column 5, Line 11, delete "520" and insert -- 52O --

Column 5, Line 16, delete "500" and insert -- 50O --

Column 5, Line 18, delete "520" and insert -- 52O --

Column 5, Line 22, delete "500" and insert -- 50O --
Column 5, Line 22, delete "520" and insert -- 52O --

In the Claims

Column 8, Line 7, after "outlet" insert -- opening --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*